United States Patent
Yamaguchi et al.

[11] Patent Number: 5,718,483
[45] Date of Patent: Feb. 17, 1998

[54] ADJUSTABLE HINGE MOUNT FOR SEATS

[75] Inventors: Satoru Yamaguchi, Toyohashi; Isao Ikegaya, Arai; Eiji Okamoto, Kosai, all of Japan

[73] Assignee: Fuji Kiko Co., Ltd., Tokyo, Japan

[21] Appl. No.: 757,609

[22] Filed: Nov. 29, 1996

[30] Foreign Application Priority Data

Nov. 30, 1995 [JP] Japan ................... 7-312207
Jul. 2, 1996 [JP] Japan ................... 8-171933

[51] Int. Cl.$^6$ ................................................. B60N 2/02
[52] U.S. Cl. ................ 297/367; 297/363; 297/365; 16/325; 16/33
[58] Field of Search ....................... 297/363, 364, 297/369, 365, 366, 367, 368; 16/325, 333

[56] References Cited

U.S. PATENT DOCUMENTS

| | | | |
|---|---|---|---|
| 3,879,802 | 4/1975 | Werner | 297/367 |
| 4,076,309 | 2/1978 | Chekirda et al. | 297/363 |
| 4,103,970 | 8/1978 | Homier | 297/367 |
| 4,435,013 | 3/1984 | Arihara | 297/364 |

FOREIGN PATENT DOCUMENTS 2931873  2/1981  Germany ................. 297/363

*Primary Examiner*—Peter M. Cuomo
*Assistant Examiner*—Anthony D. Barfield
*Attorney, Agent, or Firm*—Foley & Lardner

[57] ABSTRACT

An adjustable hinge mount for a seat having an adjustable seat back comprises an axle interconnecting first and second hinge members for pivotal motion relative to each other, an internal teeth formed in the second hinge member, a bearing plate having teeth for locking cooperation with the internal teeth, spaced guide walls formed in the first hinge member for guiding the bearing plate in reciprocal directions, and an control arrangement for controlling motion of the bearing plate into and out of engagement with the internal teeth. The control arrangement includes a lever and a cam in unitary motion with the lever for cooperation with the bearing plate. The cam is mounted to the first hinge member for pivotal motion about a cam axis located at a position spaced from an axis of the axle.

21 Claims, 10 Drawing Sheets

ADJUSTABLE HINGE MOUNT FOR SEATS

BACKGROUND OF THE INVENTION

1. Field of the Invention

The present invention relates to an adjustable hinge mount for seats having an adjustable seat back.

2. Description of the Related Art

There is already known for a long time vehicle seats currently used in automotive vehicles. These seats comprise a seat back the inclination of which can be adjusted relative to a seat proper or seat frame. A plurality of more or less complicated mechanisms have already been proposed for adjusting a seat back with respect to a seat proper. However all the known mechanisms have particular drawbacks in that, with a certain time of use, because of the design of the hinge and also because of vibrations to the vehicle, clearances are formed in the meshing engagement of the members provided for locking the seat back with respect to the seat proper.

Pending U.S. patent application Ser. No. 08/688,810 filed on Jun. 24, 1996 commonly assigned herewith discloses an adjustable hinge mount for a seat having an adjustable seat back. This U.S. application corresponds to European patent application 96110177.1 filed on Jun. 24, 1996 (=EP-A 0749865) and Korean patent application No. 23201/1966 filed on Jun. 24, 1996. This hinge mount comprises a first hinge member, a second hinge member, and an axle having an axle axis and interconnecting the first and second hinge members. A spring is coupled between the first and second hinge members for pivotally biasing the second hinge member in a forward direction about the axle axis. An internal teeth is formed in the second hinge member along a circular curved surface centered on the axle axis. A bearing plate is formed with teeth for locking engagement with the internal teeth. The bearing plate is guided by spaced guide walls of the first hinge member. A lever is pivotally connected to the first hinge member for pivotal motion about the axle axis. A cam is pivotally connected to the first hinge member for unitary motion with the lever about the axle axis for controlling the motion of the bearing plate into and out of engagement with the internal teeth of the second hinge member. According to the arrangement of the prior proposed hinge mount, the lever and the cam are supported by the axle for pivotal motion about the axle axis, the internal teeth are formed along the circular curved surface of the second hinge member centered on the axle axis, and the bearing plate is disposed between the cam and the internal teeth.

There is a growing demand to miniaturization of constituent parts or elements of the hinge mount. However such demand is not met by the above-mentioned arrangement to a satisfactory level. Specifically, to properly ensure the locking engagement of the teeth of the bearing plate with the internal teeth, the bearing plate is required to posses not only a substantial dimension along a circle centering on the axle axis, but also a substantial dimension in a radial direction with respect to the axle axis. In other words, a cam with reduced radial dimension has to be used to cut a radial distance between the axle axis and the internal teeth. However, the reduction in radial dimension of the cam results in an increase in angles through which the cam has to turn to produce an appropriate amount of cam lift to ensure locking engagement of the teeth of the bearing plate with the internal teeth as well as disengagement of the teeth of the bearing plate from the internal teeth. This means that the lever which the cam is in unitary motion with has to be pivoted through increased angles for releasing the locking engagement, requiring substantial space for the lever and impairing operability of the lever.

An object of the present invention is to improve a hinge mount of the above kind such that, with locking engagement properly ensured without any increase in angle through which the lever operates, all the constituent parts are arranged within a less radial extension or area about an axle interconnecting first and second hinge members.

SUMMARY OF THE INVENTION

According to the present invention, there is provided an adjustable hinge mount for a seat having an adjustable seat back, comprising:

a first hinge member;

a second hinge member;

an axle having an axle axis and interconnecting said first and second hinge members for pivotal motion of said first hinge member relative to said second hinge member about said axle;

an internal teeth formed in said second hinge member;

a bearing plate having teeth for locking cooperation with said internal teeth;

spaced guide walls formed in said first hinge member for guiding said bearing plate in reciprocal directions relative to said guide walls; and control means for controlling motion of said bearing plate into and out of engagement with said internal teeth;

said control means including a lever and a cam in unitary motion with said lever for cooperation with said bearing plate, said cam being mounted to said first hinge member for pivotal motion about a cam axis located at a position spaced from said axle axis.

DESCRIPTION OF THE PREFERRED EMBODIMENTS

Figure 1:
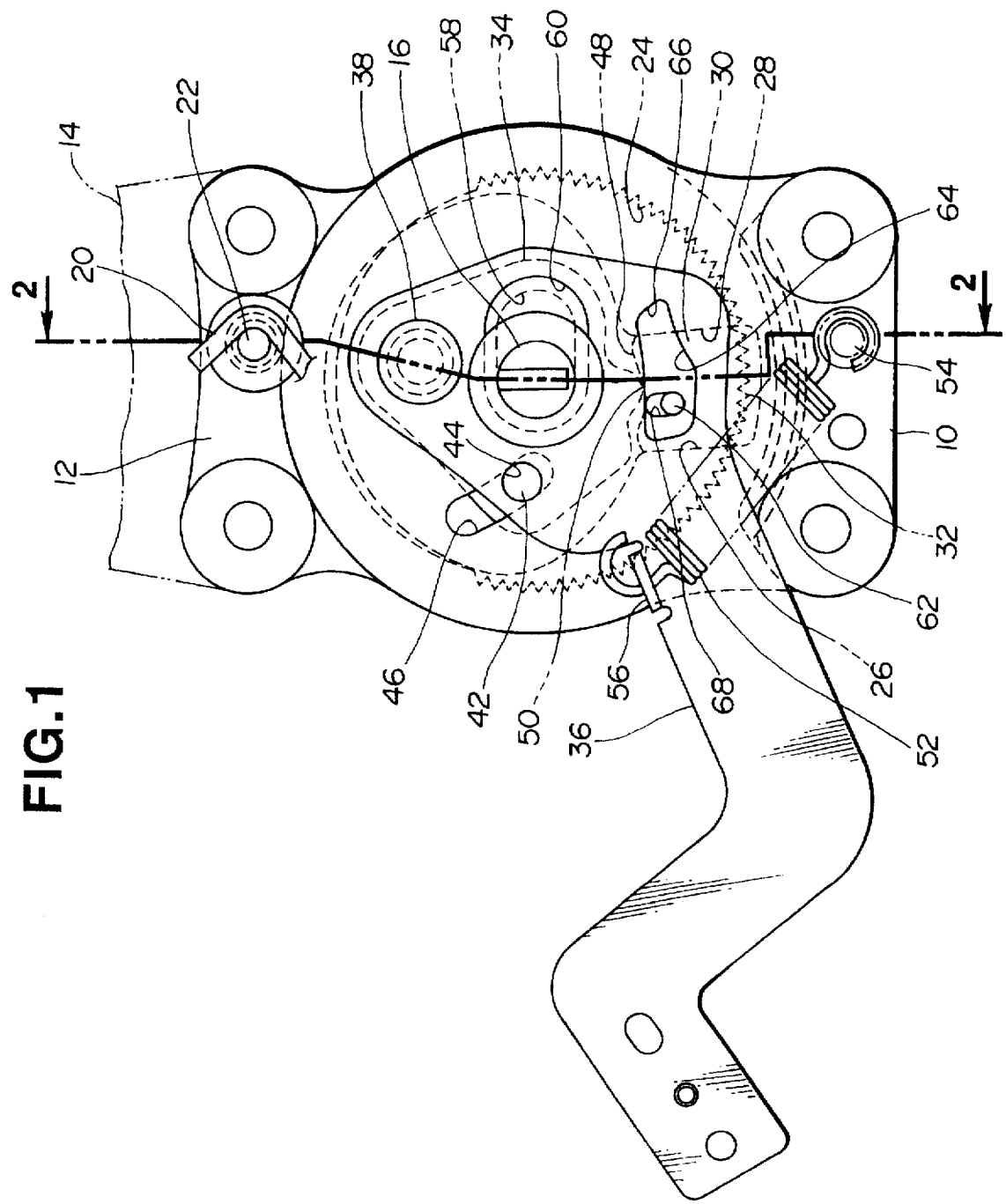
FIG. 1 is a view illustrating an adjustable hinge mount as being mounted to a left hand rear corner of a front seat for automotive vehicles, showing the parts in a locked position.

Referring to the drawings, the same reference numerals are used throughout all figures to designate like or similar parts or portions for simplicity of description.

Figure 2:
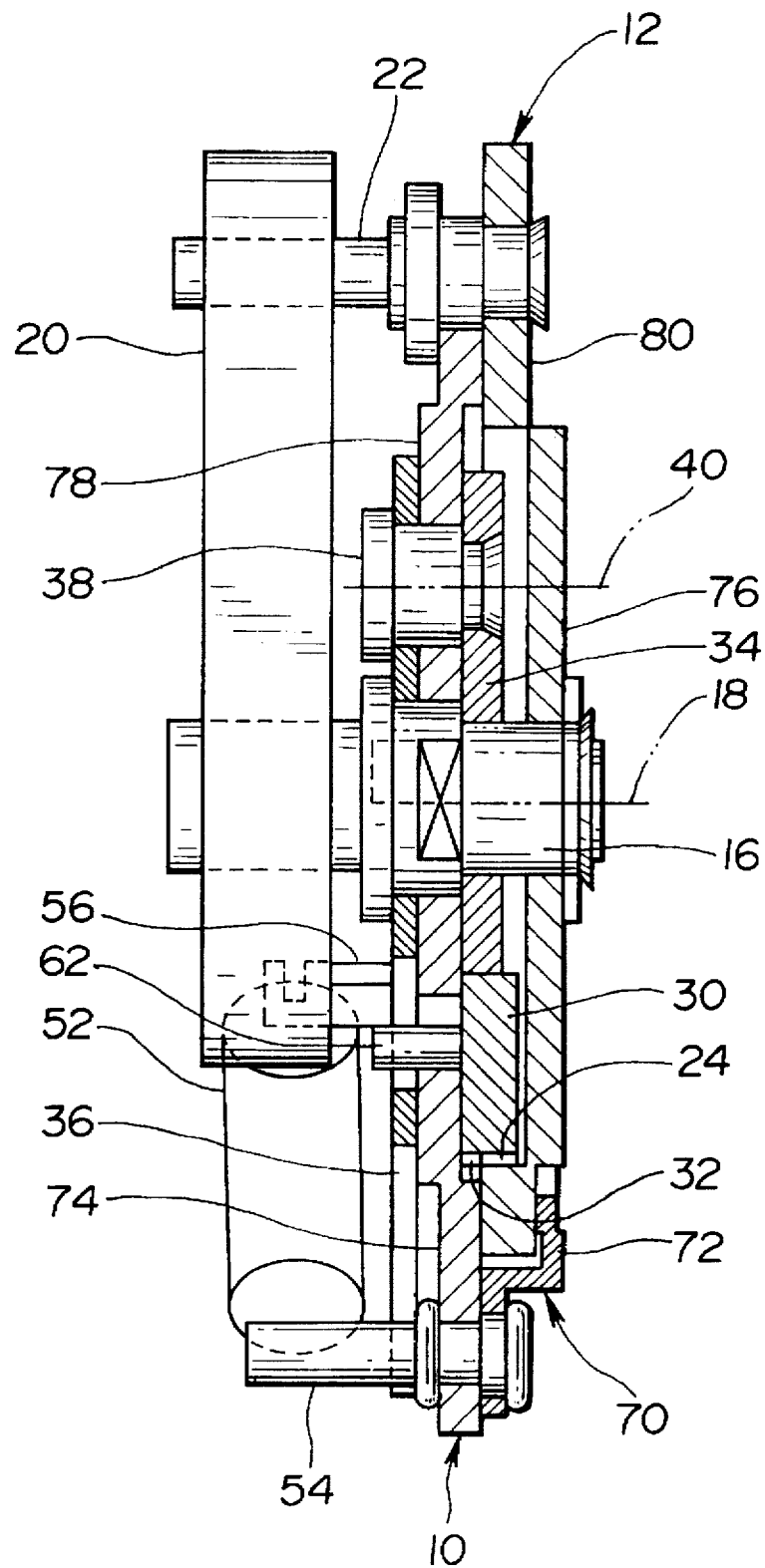
FIG. 2 illustrates the adjustable hinge mount viewing from the right in FIG. 1 partly broken away along the line 2—2 in FIG. 1.

Referring firstly to FIGS. 1 to 2, the adjustable hinge mount is designed for use in connection with a front vehicle seat having a seat back. The hinge mount includes a first hinge member 10 connectable to a lateral side of the seat proper and a second hinge member 12 connectable to a lateral side of the seat back at an arm 14 thereof as illustrated by the phantom line in FIG. 1. The two hinge members 10 and 12 are supported on and interconnected by an axle 16 having an axle axis 18.

A spring 20, in the form of a spiral spring, is coupled between the hinge members 10 and 12 for pivotally biasing the hinge member 12 in a forward direction about the axle 16. A free end of the axle 16 is formed with a hooking slot to secure an inner end of the spring 20. A hooking pin 22 of the second hinge member 12 is used for supporting an out end of the spring 20. Thus, the spring 20 has a tendency to permanently return the seat back against the back of the seat occupant.

Internal teeth 24 centered on the axle 16 are integrally formed in the second hinge member 12. The first hinge member 10 has two spaced guide walls 26 and 28 for guiding a bearing plate 30 in reciprocal directions relative to the guide walls 26 and 28. The bearing plate 30 is formed with teeth 32 for locking cooperation with the internal teeth 24.

For controlling motion of the bearing plate 30 into and out of engagement with the internal teeth 24, there is provided a cam 34 in the form of a rotary cam plate in unitary motion with a lever 36 for cooperation with the bearing plate 30. The lever 36 carries at a free end portion thereof a handle, not shown, for ease of manipulation. The cam 34 is mounted to the first hinge member 10 by a cam pin 38 having a cam axis 40 for pivotal motion about the cam axis 40. The cam axis 40 is located at a position spaced from the axle axis 18. Specifically, the bearing plate 30 is spaced from the axle axis 18 in one direction and the cam axis 40 is spaced from the axle axis 18 in a direction opposite to the one direction. The lever 36 is mounted to the first hinge member 10 by the cam pin 38 for pivotal motion about the cam axis 40. To accomplish the unitary pivotal motion of the cam 34 with the lever 36, the cam 34 has a protrusion 42 in the form of a pin, while the lever 36 is formed with an opening 44 which the protrusion 42 fits into. As best seen in FIG. 2, the first hinge member 10 is disposed between the cam 34 and the lever 36 and formed with a window 46, in the form of a circular slot centered on the cam axis 40, allowing passage of the protrusion 42 of the cam 34. In this embodiment, viewing in FIG. 1, the bearing plate 30 is formed at a lower part thereof with the teeth 32. At an upper part thereof, the bearing plate 30 is formed with a surface part 48 which is held in cooperating relation with an elevated portion 50 of the cam 34 owing to the action of a return spring 52 coupled between the first hinge member 10 and the lever 36. The return spring 52 is in the form of a helical extension spring having at one end thereof a hook engaged with an anchoring pin 54 secured to the first hinge member 10 and at the opposite end thereof a hook engaged with an anchoring lug 56 integral with the lever 36. The return spring 52 biases the lever 36 and the cam 34 counterclockwise, viewing in FIG. 1, causing the elevated portion 50 of the cam 34 to bring the bearing plate 30 into firm engagement with the internal teeth 24 which the second hinge member 12 is formed with. In order to allow rotation of the cam 34 and the lever 36 about the cam axis 40, the cam 34 and the lever 36 are formed with openings 58 and 60, respectively, receiving the axle 16. In order to secure appropriate engagement of the teeth 32 of the bearing plate 30 with the internal teeth 24 over the life of the mechanism, the window 46 extends along a circle centered on the cam axis 40 to permit further counterclockwise motion of the protrusion 42 of the cam 34 beyond the position illustrated in FIG. 1. Turning the lever 36 against the return spring 52 from the position illustrated in FIG. 1 causes the cam 34 to pivot clockwise about the cam axis 40, causing the elevated portion 50 to disengage from the surface part 48. For disengaging the bearing plate 30 from the internal teeth 24 in response to this turning movement of the lever 36, the bearing plate 30 has a release pin 62 and the lever 36 is formed with a slope 64 forming a part of edge defining an opening 66. The release pin 62 passes through an elongate slot 68 of the first hinge member 10 and has a free end portion thereof disposed in the opening 66 for cooperation with the slope 64. The elongate slot 68 is long enough to allow movement of the bearing plate 30 in reciprocal directions guided by the guide walls 26 and 28. The relationship between the free end portion of the release pin 62 and the slope 64 is such that, in the position illustrated in FIG. 1, the slope 64 is separated from the release pin 62, but during turning movement of the lever 36 against the action of the return spring 52, the slope 64 comes into contact with the release pin 62 when the lever 36 turns through a predetermined angle and lifts the release pin 62 to disengage the bearing plate 30 from the internal teeth 24 as the lever 36 turns against the action of the return spring 52 beyond the predetermined angle. From the preceding description it is now seen that, during turning movement of the lever 36 against the action of the return spring 52 from the position illustrated in FIG. 1, the elevated portion 50 of the cam 34 is separated from the bearing plate 30 prior to action of the slope 64 on the release pin 62 to move the bearing plate 30 out of engagement with the internal teeth 24.

Viewing in FIGS. 1 and 2, a holder 70 is fixed to the first hinge member 10 by means of a plurality of pins including the above mentioned anchoring pin 54. As best seen in FIG. 2, a lower peripheral portion of the second hinge member 12 is interposed between an impressed upper curved marginal portion 72 of the holder 70 and the first hinge member 10. This arrangement holds the second hinge member 12 against the first hinge member 10, ensuring appropriate engagement of the internal teeth 24 with the teeth 32 of the bearing plate 32 over the life of the mechanism.

As will be readily understood from FIG. 2, the first and second hinge members 10 and 12 are formed with impressed portions 74 and 76. The impressed portion 74 of the first hinge member 10 surrounds a major inner portion 78 and connects at a portion with the latter through the two spaced guide walls 26 and 28. The impressed portion 76 of the second hinge member 12 is surrounded by a major outer portion 80. The major outer portion 80 of the second hinge member 12 cooperates with the impressed outer portion 74 of the first hinge member 10 for pivotal motion of the second hinge member 12 relative to the first hinge member 10 about the axle 16. Disposed between the major inner portion 78 of the first hinge member 10 and the impressed inner portion 76 of the second hinge member 12 are the bearing plate 30 and the cam 34.

Viewing in FIG. 2, the major inner portion 78 of the first hinge member 10 is recessed in one direction from the surrounding impressed portion 74, while the impressed inner portion 76 of the second hinge member 76 is recessed in the opposite direction from the surrounding major outer portion 80, defining between the portions 78 and 76 a space within which the bearing plate 30 and the cam 34 are mounted.

In the previously described first embodiment, the lever 36 for actuating the cam 34 carries the handle for manipulation by an operator, such as the seat occupant. In the second and third embodiments which are to be described hereinafter, a lever does not directly carry a handle, but connected to one end of a motion transmitting member whose opposite end is connected to a handle.

Referring to FIGS. 3 through 8, the second embodiment is described. This second embodiment is substantially the same as the first embodiment except that the spring 20 for pivotally biasing the first and second hinge members 10 and 12 relative to each other is not provided, a protrusion 42 of a cam 34 is not in the form of a pin, but in the form of an integral lug (see FIG. 6) of the cam 34, a return spring 52 is not in the form of the helical extension spring, but in the form of a spiral spring having an inner end secured to a spring retainer 90 and an outer end secured to an anchoring lug 56 of a lever 31, and the cam pin 38 is not used for mounting the cam 34, but the cam 34 has an integral boss 94 received in a recess of a first hinge member 10 (see FIG. 5) for pivotal motion about a cam axis 40.

As different from the first embodiment, a second hinge member 12 (see FIGS. 3 and 8) is connectable to a lateral side of a seat proper and the first hinge member 10 (see FIGS. 3 and 7) is connectable to a lateral side of the seat back.

Figure 5:
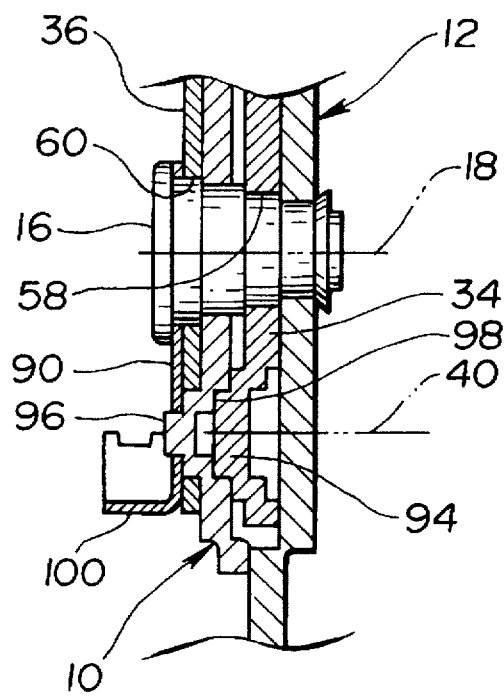
FIG. 5 is a fragmentary section taken through the line 5—5 of FIG. 4.
Figure 6:
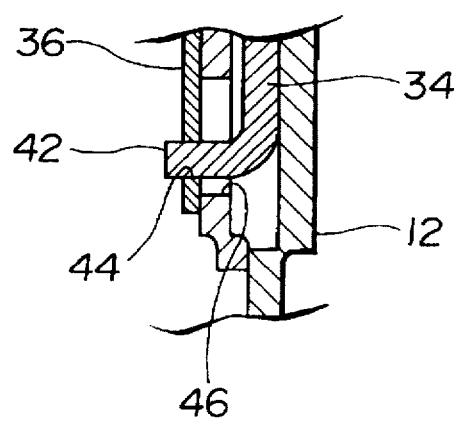
FIG. 6 is a fragmentary section taken through the line 6—6 of FIG. 4.
Figure 7:
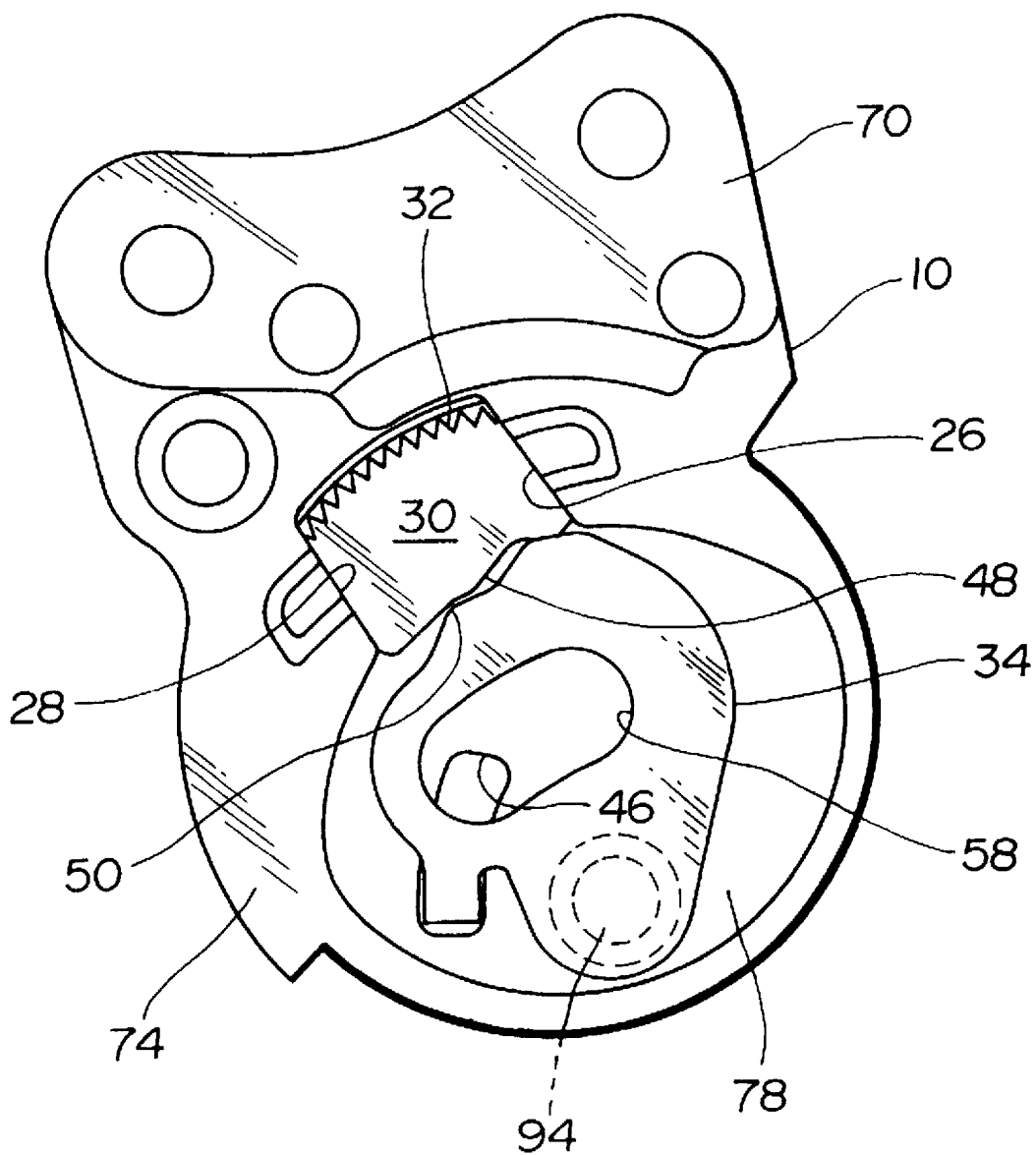
FIG. 7 illustrates a first hinge member of the adjustable hinge mount shown in FIG. 3 together with a bearing plate, a cam and a holder mounted thereto.
Figure 8:
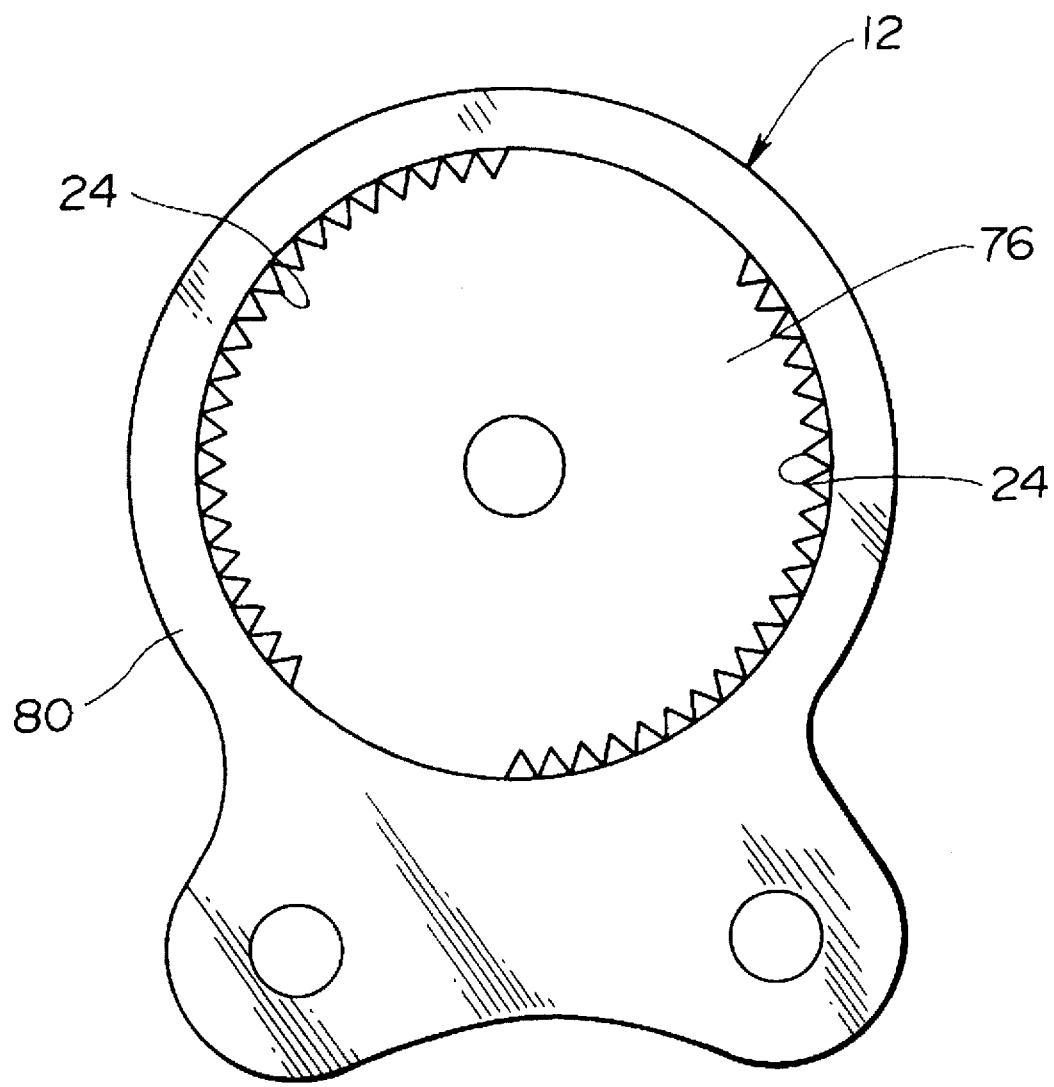
FIG. 8 illustrates a second hinge member of the adjustable hinge mount with an internal teeth.

As best seen in FIG. 5, the first hinge member 10 is embossed to form a boss 96 projecting from an outer face thereof and a circular recess 98 recessed from an inner face thereof. The spring retainer 90 is anchored at one end portion thereof to an axle 16 which interconnects the first and second hinge members 10 and 12. At the opposite end portion thereof, the spring retainer 90 is anchored to the boss 96 of the first hinge member 10. The spring retainer 90 is therefore held in unitary pivotal motion with the first hinge member about an axle axis 18. With the boss 96 of the first hinge member 10, the lever 36 is mounted to the first hinge member 10 for pivotal motion about a cam axis 40. The cam 34 is mounted to the first hinge member 10 with the integral boss 94 thereof received in the circular recess 98. As is readily seen from FIGS. 3, 5 and 7, the cam 34 is formed with an opening 58 through which the axle 16 passes. Thus, the cam 34 is pivotal about the cam axis 40. For ease of mounting the inner end of the spiral return spring 52, the spring retainer 90 terminates in an integral collar 100 (see FIGS. 3 and 5).

The first hinge member 10 is formed with a window 46, in the form of a circular slot centered on the cam axis 40, allowing passage of the protrusion 42 of the cam 34. The protrusion 42 fits into an opening 44 with which the first hinge member 10 is formed for accomplishing unitary motion of the cam 34 with the lever 36.

Figure 3:
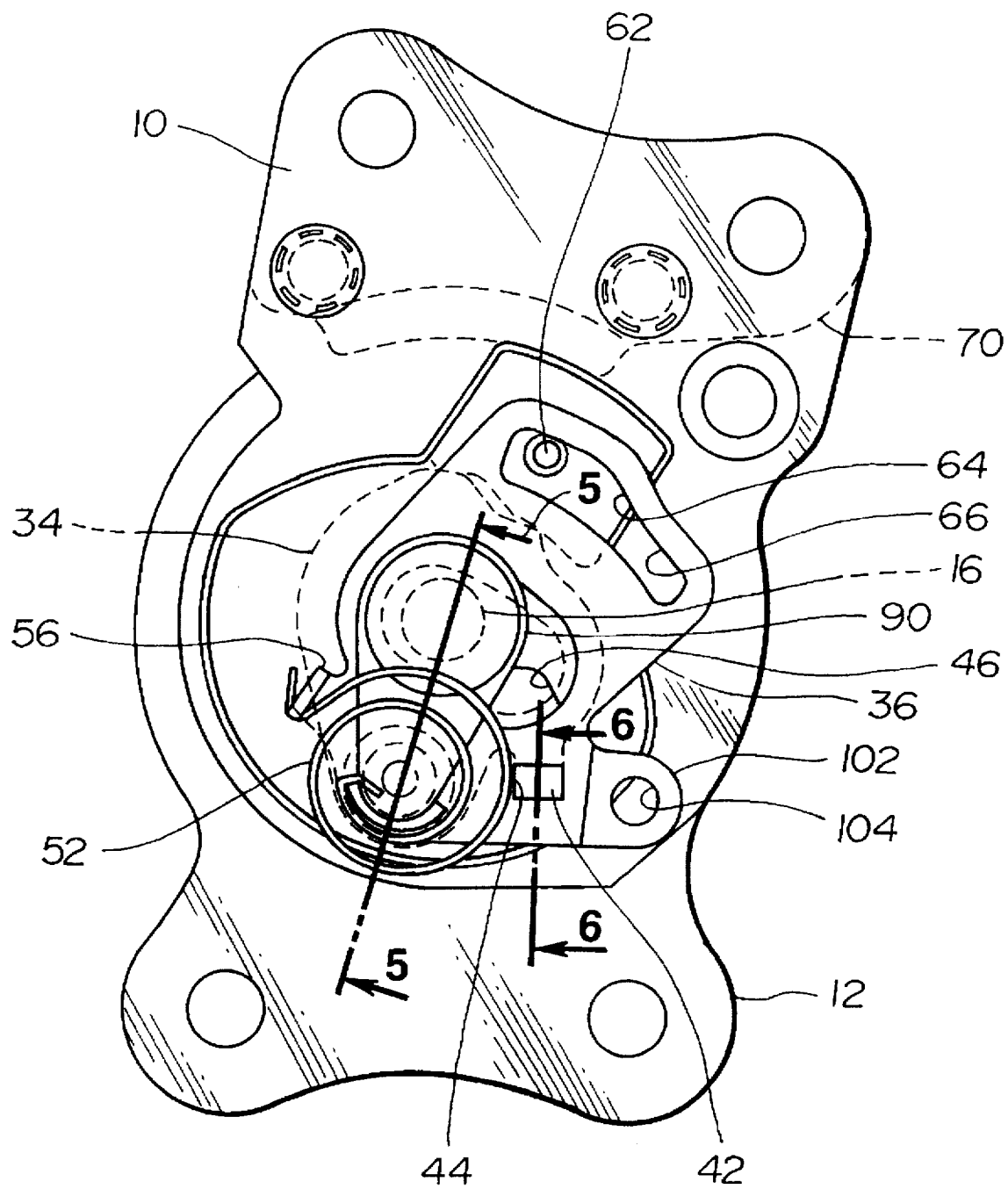
FIG. 3 is a view illustrating a second embodiment of an adjustable hinge mount as being mounted to a left hand rear corner of a rear seat for automotive vehicles.
Figure 4:
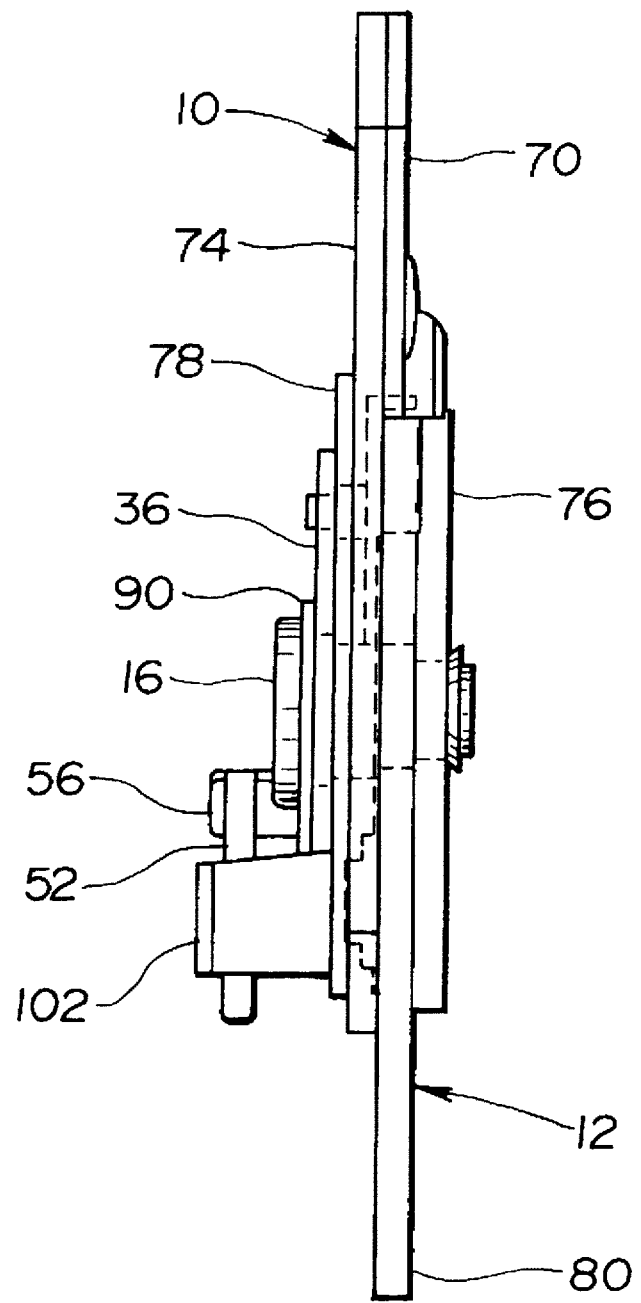
FIG. 4 illustrates the adjustable hinge mount viewing from the right in FIG. 3.

As seen from FIGS. 3 and 4, the lever 36 has an integral arm portion 102 formed with an anchoring opening 104 for the wire.

Figure 9:
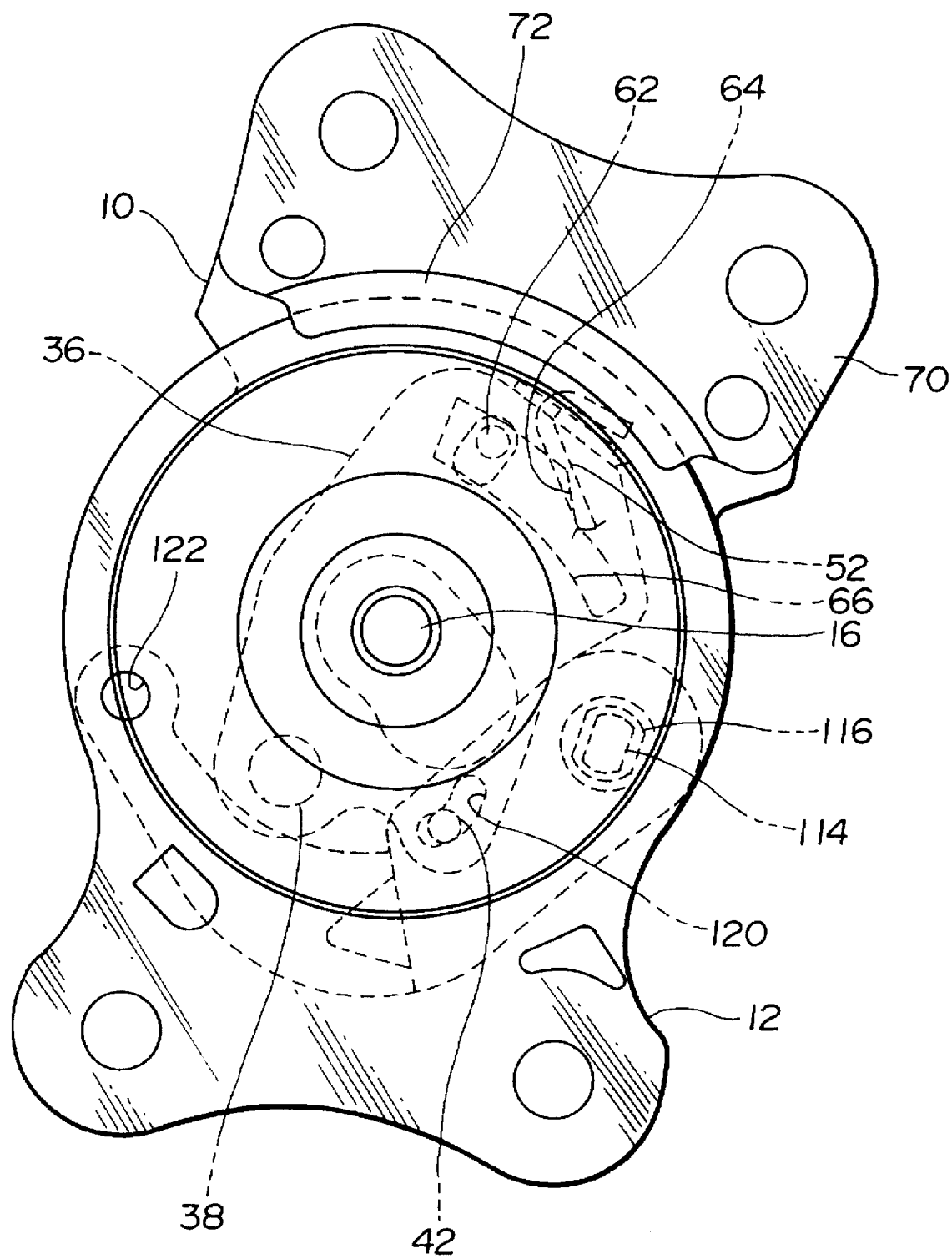
FIG. 9 is a view illustrating a third embodiment of an adjustable hinge mount as being mounted to a left hand rear corner of a rear seat for automotive vehicles.
Figure 10:
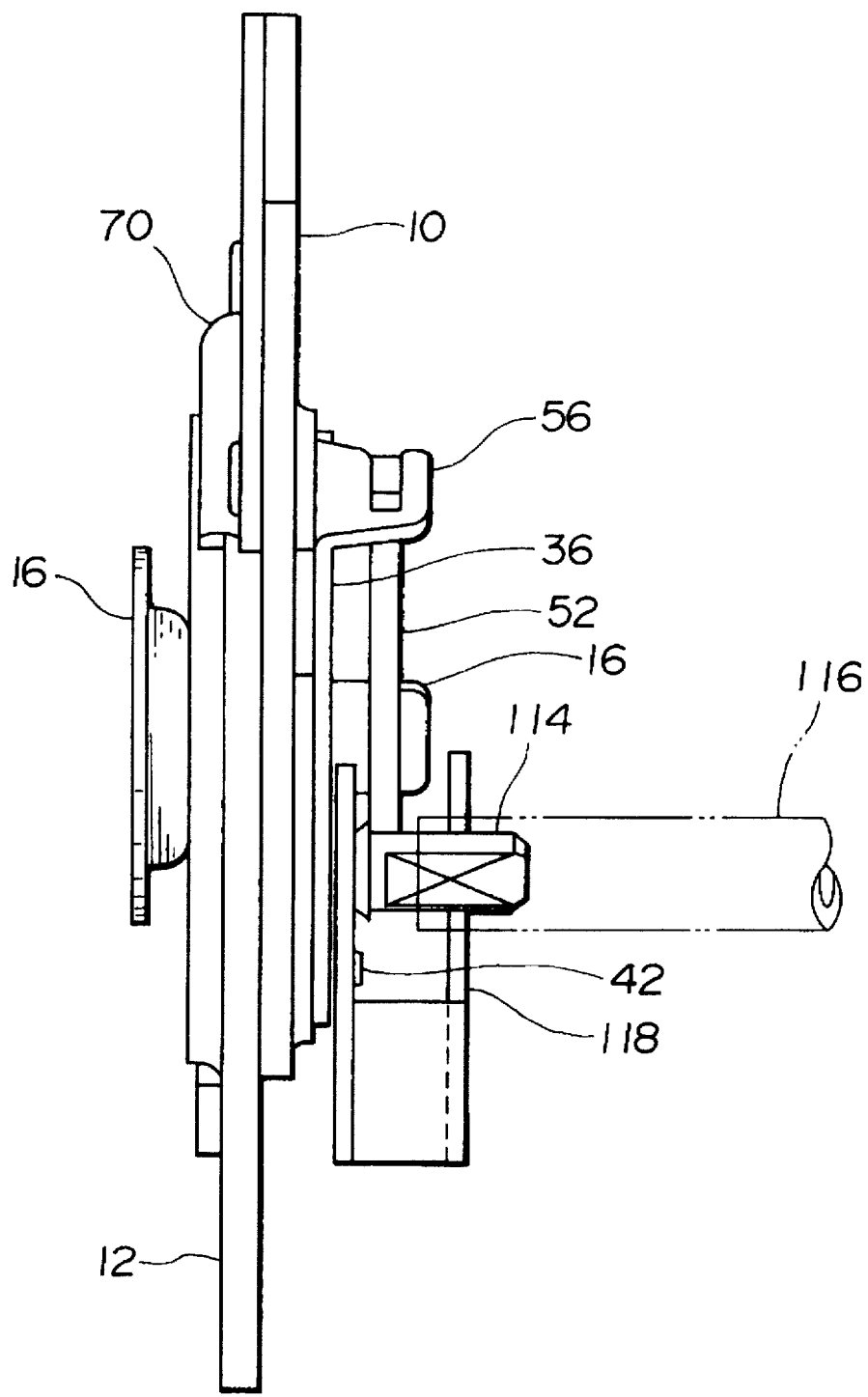
FIG. 10 illustrates the adjustable hinge mount viewing from the right in FIG. 9.
Figure 11:
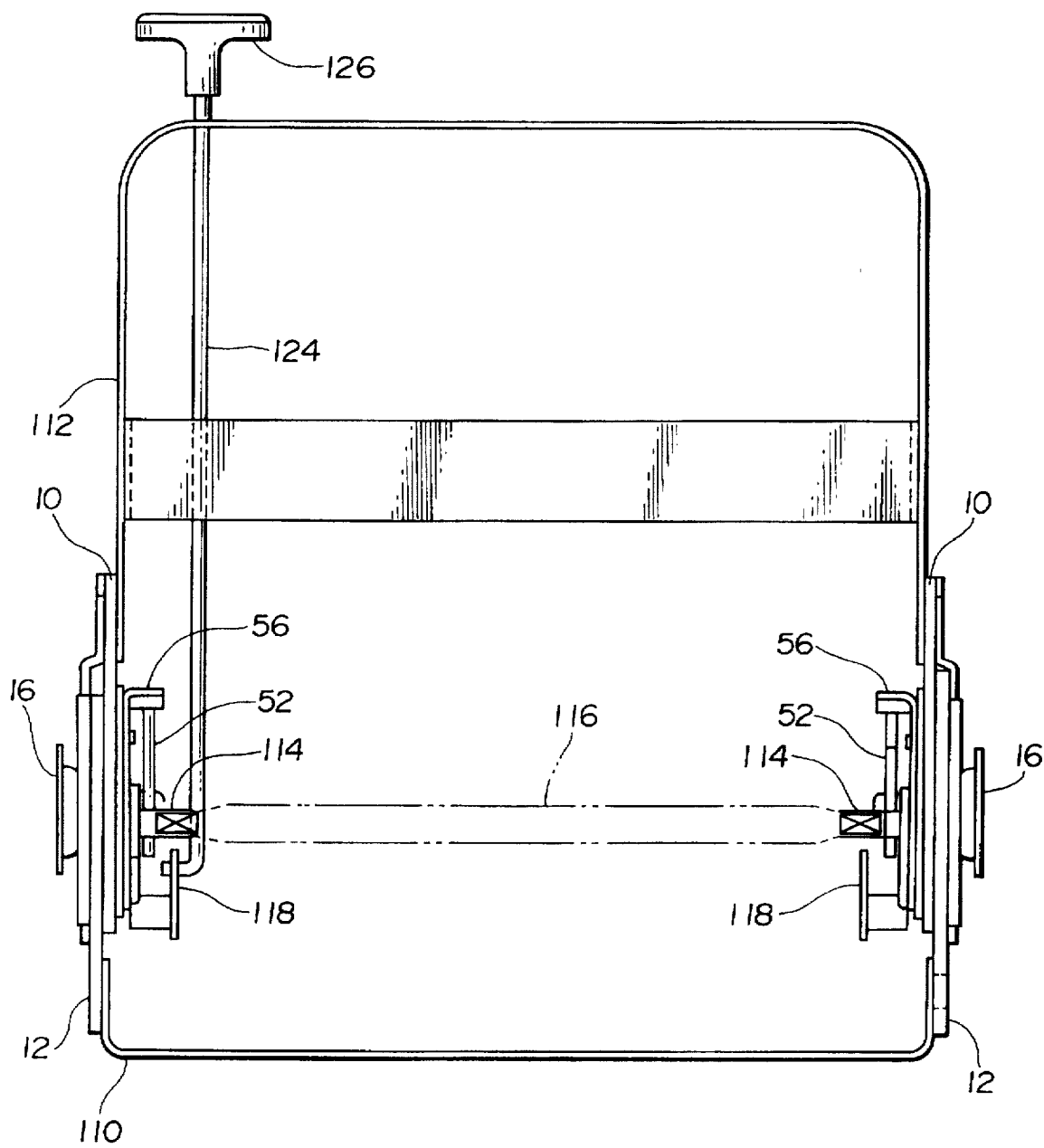
FIG. 11 illustrates a seat recliner mechanism incorporating the adjustable hinge mount shown in FIG. 9.

Referring to FIGS. 9 to 10, the third embodiment is described. Similarly to the second embodiment, as shown in FIG. 11, a second hinge member 12 is secured to a lateral side of a seat proper 110 (see FIG. 11) and a first hinge member 10 is secured to a lateral side of a seat back 112. This third embodiment is substantially the same as the second embodiment except that a lever 36 and a cam, not shown, are mounted to a first hinge member 10 with a cam pin 38 for pivotal motion about a cam axis 40, the first hinge member 12 has a second axle 114 having a non-circular part to be received by a motion transmitting pipe 116 shown in phantom line in FIG. 11, and a second lever 118 is mounted to the first hinge member 10 for pivotal motion about the second axle 114 and cooperating with the first mentioned lever 36 via a slot 120 receiving a protrusion 42, in the form of a pin, of a cam, not shown.

The second lever 118 is formed at a free end portion thereof with an opening 122 receiving one end of a control rod 124 whose opposite end connected to a handle 126 as shown in FIG. 11. At a portion intermediate both ends, the second lever 118 is formed with the slot 120 receiving the protrusion pin 42 of the cam as shown in FIG. 9. Referring to FIG. 10, a return spring 52 has an outer end engaged with an anchoring lug 56 integral with the lever 36 and an inner end engaged with the axle 16 for biasing the lever 36 and the cam bout the cam pin 38.

Viewing in FIG. 9, the second axle 14 is located at a portion spaced from the axle 16 in a direction oriented rightwards and downwards. In other words, since a forward direction is oriented liftwards as viewed in FIG. 9, the second axle 114 is spaced from the axle 16 in a direction oriented rearwards and downwards. This arrangement of the second axle 114 allows eccentric mount of the motion transmitting pipe 116 without any interference with a hip portion of the seat occupant.

It will be noted from the preceding description that the lever 36 can be operated by manipulating the handle 126.

What is claimed is:

1. An adjustable hinge mount for a seat having an adjustable seat back, comprising:

a first hinge member;

a second hinge member;

an axle having an axle axis and interconnecting said first and second hinge members for pivotal motion of said first hinge member relative to said second hinge member about said axle;

an internal teeth formed in said second hinge member;

a bearing plate having teeth for locking cooperation with said internal teeth;

spaced guide walls formed in said first hinge member for guiding said bearing plate in reciprocal directions relative to said guide walls; and control means for controlling motion of said bearing plate into and out of engagement with said internal teeth, said control means including a lever and a cam in unitary motion with said lever for cooperation with said bearing plate, said cam being mounted to said first hinge member for pivotal motion about a cam axis located at a position spaced from said axle axis.

2. An adjustable hinge mount as claimed in claim 1, wherein said bearing plate is spaced from said axle axis in one direction and said cam axis is spaced from said axle axis in a direction opposite to said one direction.

3. An adjustable hinge mount as claimed in claim 2, wherein said control means include a return spring coupled between said first hinge member and said lever for pivotally biasing said lever and said cam relative to said first hinge member about said cam axis.

4. An adjustable hinge mount as claimed in claim 3, wherein said return spring is in the form of a helical extension spring having at one end thereof a hook engaged with said lever and at opposite end thereof a hook engaged with said first hinge member.

5. An adjustable hinge mount as claimed in claim 3, wherein said first hinge member is formed on one face with a boss and on the opposite face a recess and said cam has a boss received in said recess of said first hinge member.

6. An adjustable hinge mount as claimed in claim 5, wherein said control means include a spring retainer bridging said axle and said boss of said first hinge member and said return spring is in the form of a spiral spring having at an outer end thereof a hook engaged with said lever and at an inner end thereof a hook engaged with said spring retainer.

7. An adjustable hinge mount as claimed in claim 6, wherein said boss of said first hinge member and said boss of said cam are centered on said cam axis.

8. An adjustable hinge mount as claimed in claim 1, wherein said lever is mounted to said first hinge member for pivotal motion about said cam axis.

9. An adjustable hinge mount as claimed in claim 1, wherein said control means include a pin of said bearing plate and a slot which said lever is formed with, said slot receiving said pin and cooperating with said pin to provide means for disengaging said bearing plate from said internal teeth in response to movement of said lever.

10. An adjustable hinge mount as claimed in claim 1, wherein said cam has a protrusion in locking engagement with an opening with which said lever is formed, thereby to accomplish said unitary motion of said cam with said lever.

11. An adjustable hinge mount as claimed in claim 10, wherein said first hinge member is disposed between said cam and said lever and formed with a window allowing passage of said protrusion.

12. An adjustable hinge mount as claimed in claim 10, wherein said protrusion of said cam is in the form of a pin.

13. An adjustable hinge mount as claimed in claim 10, wherein said protrusion of said cam is in the form of a lug integral with said cam.

14. An adjustable hinge mount as claimed in claim 1, wherein said first hinge member has a cam pin supporting said cam for pivotal motion of said cam about said cam axis.

15. An adjustable hinge mount as claimed in claim 1, wherein said cam has a boss and said first hinge member is formed with a recess receiving said boss for pivotal motion of said cam about said cam axis.

16. An adjustable hinge mount as claimed in claim 1, further comprising:

a spring coupled between said first and second hinge members for pivotally biasing said first and second hinge members relative to each other about said axle axis.

17. An adjustable hinge mount as claimed in claim 1, wherein said control means include a second axle on said first hinge member located at a location spaced from said first-mentioned axle, and a second lever mounted to said first hinge member for pivotal motion about said second axle in cooperation with said first-mentioned lever.

18. An adjustable hinge mount as claimed in claim 17, wherein said control means further include slot and pin means for operatively connecting said second lever and said first-mentioned lever.

19. An adjustable hinge mount as claimed in claim 18, wherein said second lever is mounted at one end portion thereof to said second axle for pivotal motion, and said second lever is formed at an opposite free end portion thereof with an opening adapted to receive one end of a control rod whose opposite end is connected to a handle.

20. An adjustable hinge mount as claimed in claim 19, wherein said slot and pin means include a slot formed in said second lever at a portion intermediate said one and opposite end portions of said second lever.

21. A seat recliner including an adjustable hinge mount as claimed in claim 17, comprising:

a motion transmitting member fixedly coupled at one end thereof with said second axle.

* * * * *